(12) United States Patent
Lauer (10) Patent No.: US 7,570,590 B2
(45) Date of Patent: Aug. 4, 2009

(54) DECISION TREE LOGIC FOR DETERMINING THE OPTIMAL VALUE FOR QOS UPLINK AND DOWNLINK MAXIMUM BITRATE ATTRIBUTES

(75) Inventor: Bryan A. Lauer, Hinckley, IL (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 937 days.

(21) Appl. No.: 10/695,086

(22) Filed: Oct. 28, 2003

(65) Prior Publication Data

US 2005/0088968 A1 Apr. 28, 2005

(51) Int. Cl.
H04L 12/56 (2006.01)

(52) U.S. Cl. .................. 370/235; 370/310; 370/395.2; 370/477

(58) Field of Classification Search ......... 370/229–235, 370/310, 395.2–395.21, 322, 329, 340–341, 370/348, 352–353, 395.64, 398, 477; 455/425, 455/550.1
See application file for complete search history.

(56) References Cited

U.S. PATENT DOCUMENTS

| | | | | |
|---|---|---|---|---|
| 5,153,877 | A * | 10/1992 | Esaki et al. | 370/389 |
| 6,058,114 | A * | 5/2000 | Sethuram et al. | 370/397 |
| 6,080,202 | A * | 6/2000 | Strickland et al. | 703/27 |
| 6,167,283 | A * | 12/2000 | Korpela et al. | 455/525 |
| 6,216,006 | B1 * | 4/2001 | Scholefield et al. | 455/450 |
| 6,618,591 | B1 * | 9/2003 | Kalliokulju et al. | 455/452.2 |
| 6,628,670 | B1 * | 9/2003 | Galand et al. | 370/468 |
| 6,647,058 | B1 * | 11/2003 | Bremer et al. | 375/222 |
| 7,003,794 | B2 * | 2/2006 | Arye | 725/100 |
| 2002/0097740 | A1 * | 7/2002 | Choi et al. | 370/441 |
| 2002/0147020 | A1 * | 10/2002 | Iguchi et al. | 455/452 |
| 2002/0191570 | A1 * | 12/2002 | Kim et al. | 370/335 |

(Continued)

FOREIGN PATENT DOCUMENTS

EP 1 096 742 A1 5/2001

(Continued)

OTHER PUBLICATIONS

Daniel Fernandez and Hector Montes, An Enchanced Quality of Service Method for Guaranteed Britrate Services Over Shared Channels in Egprs Systems, Nokia Networks, C/Severo Ochoa, s/n Edif. de Inst. Universitarios, Pl. 3., Parque Tecnologico de Andalucio-29590 Campanillas (Malaga) Spain.

(Continued)

Primary Examiner—Aung S Moe
Assistant Examiner—Curtis A Alia (57) ABSTRACT

Logic for responding to a Maximum Bitrate request includes comparing the requesting Maximum Bitrate and a Maximum Bitrate limit to Supported Maximum Bitrates. If the Maximum Bitrate limit is not at least as high as a lowest Supported Maximum Bitrate, communications services associated with the requested Maximum Bitrate are not provided. If the Maximum Bitrate limit is at least as high as the lowest Supported Maximum Bitrate, an Offered Bitrate is selected from a set of Supported Maximum Bitrates that is at least as high as the requested Maximum Bitrate and no higher than the Maximum Bitrate limit as long as such a Supported Maximum Bitrate exists. If such a Supported Maximum Bitrate does not exist, the Offered Bitrate is selected to be a highest available Supported Maximum Bitrate that is not higher than the Maximum Bitrate Limit.

28 Claims, 6 Drawing Sheets

U.S. PATENT DOCUMENTS

| | | | | |
|---|---|---|---|---|
| 2002/0193106 | A1* | 12/2002 | Koo et al. | 455/423 |
| 2003/0073437 | A1* | 4/2003 | Yuen | 755/432 |
| 2003/0095572 | A1* | 5/2003 | Efthymiou | 370/468 |
| 2003/0219037 | A1* | 11/2003 | Toskala et al. | 370/496 |
| 2003/0232624 | A1* | 12/2003 | Toskala et al. | 455/509 |
| 2004/0001462 | A1* | 1/2004 | Yavuz et al. | 370/333 |
| 2004/0057420 | A1* | 3/2004 | Curcio et al. | 370/352 |
| 2004/0202136 | A1* | 10/2004 | Attar et al. | 370/333 |
| 2006/0159105 | A1* | 7/2006 | Kleo | 370/395.21 |
| 2006/0165027 | A1* | 7/2006 | Heden | 370/328 |

FOREIGN PATENT DOCUMENTS

| | | |
|---|---|---|
| EP | 1 276 345 A1 | 1/2003 |

OTHER PUBLICATIONS

"3$^{rd}$ Generation Partnership Project, Technical Specification Group Services and System Aspects, Quality of Service (QoS) Concept and Architecture (Release 5)", 3 GPP TS 23107 V5.9.0, Jun. 1, 2003, pp. 1040, XP002320126.

Communication.

* cited by examiner

DECISION TREE LOGIC FOR DETERMINING THE OPTIMAL VALUE FOR QOS UPLINK AND DOWNLINK MAXIMUM BITRATE ATTRIBUTES

BACKGROUND

This disclosure is directed to the art of network communications and more particularly to the art of negotiating Quality of Service (QoS) attributes or parameters between network elements. Embodiments will be described in terms of the Universal Mobile Telecommunications System (UMTS) and a Maximum Bitrate (MBR) attribute or parameter associated with Packet Data Protocol (PDP) contexts and Quality of Service (QoS) levels thereof.

Network communication providers attempt to allocate resources to maximize efficiency. For example, in UMTS networks, there is an effort to allocate only the appropriate bandwidth for any particular communication session. The appropriateness of a particular bandwidth allocation is determined based on a Quality of Service level subscribed for by a communication service subscriber and the needs of a particular communications application. For instance, e-mail and messaging traffic may need a lower Quality of Service (i.e., bitrate) than do voice or video communication sessions. Additionally, in order to conserve network resources so that the resources can be allocated to subscribers who have paid for, or are willing to pay for, high bandwidth, it is important that subscribers that do not need, or are unwilling to pay for, broadband communication are not allocated network resources beyond those that are necessary to provide the communication services that are required or subscribed for.

Part of the process of allocating appropriate resources is a negotiation between network components to establish an agreement about communication attributes or parameters associated with a particular communication session.

In UMTS networks, one of those attributes or parameters is a Maximum Bitrate (MBR). There is a Maximum Bitrate associated with an uplink (e.g., from a mobile device to a mobile communications network) and a second Maximum Bitrate associated with a downlink (from the mobile communications network to the mobile device). MBR attributes define a data rate upper limit associated with a Quality of Service level subscribed for by a subscriber. Guaranteed Bitrates (GBR) define lower limits for the Quality of Service level.

This disclosure is directed toward systems and methods for a portion of the negotiation process related to the Uplink and Downlink (UL, DL) MBR attributes or parameters. However, these processes are similar and will be described collectively. Maximum Bitrate (MBR) values will be referred to. It is to be understood that the described procedures are applied equally well to Uplink (UL) and Downlink (DL) MBR values.

Currently, MBR negotiations are not as efficient as they could be. In some instances, when a mobile device or an application running on a mobile device, requests a particular MBR, that request is simply granted or accommodated. For example, some systems do not verify that the requested MBR is within a subscribed for range of allowable MBRs. If the requested MBR is a supported MBR, that is, the requested MBR has the value of a Maximum Bitrate that associated network components can comply with, the network accepts or grants the requested MBR, and a communications session is established in association with that MBR. If the requested MBR does not exactly coincide with a network-supported MBR, or does not match a value in a set of available MBRs, some systems respond by offering to provide communication services in association with the closest available MBR or a next higher supported MBR. This results in an inefficient use of network resources because resources are allocated that are either not required for the present communication session or that have not, or will not, be paid for.

In other networks, when a requested MBR does not exactly match a value in a set of available or network-supported MBRs, the requested communication service associated therewith is simply rejected or declined. Clearly, the subscriber finds this undesirable because a desired communication service is not provided. Additionally, the communication service provider finds this undesirable because revenue that the communication service would have generated is not collected.

In still other systems, a lengthy trial and error negotiation is carried out wherein alternative MBRs are offered and rejected in a series of messages between network elements and the mobile device. This results in longer call set-up times and an inefficient use of control networks.

Therefore, there is desire for a system and method for determining an optimal MBR value to be used in response to a requested MBR.

SUMMARY

A method for a network element to respond to a Maximum Bitrate request of user equipment of a subscriber includes receiving a requested Maximum Bitrate attribute or parameter value, determining if a Maximum Bitrate limit of the subscriber is equal to or greater than a value of a lowest valued member of a set of available Maximum Bitrate values, offering to provide requested communication services in association with an offered Maximum Bitrate, if the Maximum Bitrate limit of the subscriber is equal to or greater than the value of the lowest valued member of the set of available Maximum Bitrate values, the offered Maximum Bitrate value being equal to a value of a member of an allowable subset of the set of available Maximum Bitrate values, the allowable subset consisting of members of the set of available Maximum Bitrates that have values less than or equal to the Maximum Bitrate limit, and the offered Maximum Bitrate being equal to a value of a member of the allowable subset that is greater than or equal to, the lower of the requested Maximum Bitrate value and the Maximum Bitrate limit, or has the highest value of the subset, and declining the requested communications service if the Maximum Bitrate limit of the subscriber is not equal to or greater than the value of lowest valued member of the set of available Maximum Bitrate values.

In some instances, offering to provide the requested communication services in association with the offered Maximum Bitrate includes setting a Temporary Working Value equal to a lowest value selected from among the requested Maximum Bitrate attribute or parameter value and the Maximum Bitrate limit, determining whether the Temporary Working Value is equal to a value of a member of the allowable subset of the set of available Maximum Bitrate values, higher than the values of all the members of the allowable subset of the set of available Maximum Bitrate values, between a next higher valued member and a next lower valued member of the allowable subset of the set of available Maximum Bitrate values, or lower than the values of all the members in the set of available Maximum Bitrate values, setting the offered Maximum Bitrate value equal to the Temporary Working Value if the Temporary Working Value is equal to the value of a member of the allowable subset of the set of available Maximum Bitrate values and, offering to provide requested communications services in association with the offered Maximum Bitrate value.

In other instances, offering to provide the requested communication services in association with the offered Maximum Bitrate value includes setting the offered Maximum Bitrate value equal to a value of the highest valued member of the allowable subset of the set of available Maximum Bitrate values if the Temporary Working Value is higher than the values of members of the allowable subset of the set of available Maximum Bitrate values, and offering to provide requested communications services at the offered Maximum Bitrate value.

In some instances, offering to provide the requested communication services in association with the offered Maximum Bitrate value includes setting the offered Maximum Bitrate value equal to a value of a lowest valued member of the allowable subset of the set of available Maximum Bitrate values if the Temporary Working Value is lower than all the values of members of the set of available Maximum Bitrate values, and offering to provide requested communications services at the offered Maximum Bitrate value.

In still other instances offering to provide the requested communication services in association with the offered Maximum Bitrate value includes setting the offered Maximum Bitrate value equal to a value of the next higher valued member of the allowable subset of the set of available Maximum Bitrate values if the Temporary Working Value is between the next higher and a next lower valued members of the allowable subset of the set of available Maximum Bitrate values and the next higher valued member is less than or equal to the Maximum Bitrate limit or setting the offered Maximum Bitrate value equal to a value of the next lower member of the allowable subset of the set of available Maximum Bitrate values if the Temporary Working Value is between the next higher and the next lower valued members and the next higher member is greater than the Maximum Bitrate limit.

Some embodiments include a method for a network element to respond to a Maximum Bitrate request of user equipment of a subscriber. The method includes receiving a requested Maximum Bitrate attribute or parameter value and determining if a lowest network element supported Maximum Bitrate value is equal to or less than a Maximum Bitrate limit associated with the subscriber. If the lowest network element supported Maximum Bitrate value is equal to or less than the Maximum Bitrate limit associated with the subscriber the method includes determining a Temporary Working Value from among the requested Maximum Bitrate attribute or parameter value and the Maximum Bitrate limit, determining whether the temporary working is a network element supported value, above all network element supported values, below all network element supported values or between two network element supported values and offering a value in response to the Maximum Bitrate request based on the determination of whether the Temporary Working Value is above all network element supported values, below all network element supported values or between two network element supported values.

For example, offering the value in response to the Maximum Bitrate request can include offering the Temporary Working Value in response to the Maximum Bitrate request if the Temporary Working Value is a network element supported value, offering a highest network element supported value in response to the Maximum Bitrate request if the Temporary Working Value is above all network element supported values, offering a lowest supported value in response to the Maximum Bitrate request if the Temporary Working Value is below all network element supported values, offering a next higher network element supported value if the Temporary Working Value is between a next higher and a next lower network element supported value and the next higher network element supported value is less than or equal to the Maximum Bitrate limit or offering the next lower network element supported value if the Temporary Working Value is between the next higher and the next lower network element supported values and the next higher network element supported value is greater than the Maximum Bitrate limit. Offering the value in response to the Maximum Bitrate can also include offering a next higher network element supported value if the Temporary Working Value is between a next higher and a next lower network element supported value and the next higher network element supported value is less than or equal to the Maximum Bitrate limit, or offering a next lower network element supported value if the Temporary Working Value is between a next higher and a next lower network element supported value and the next higher network element supported value is greater than the Maximum Bitrate limit.

In some embodiments, determining if the lowest network element supported Maximum Bitrate value is below a Maximum Bitrate limit associated with the subscriber and if the lowest network element supported Maximum Bitrate value is below the Maximum Bitrate limit associated with the subscriber can include determining if an SGSN supported Maximum Bitrate Value is below a Maximum Bitrate limit associated with the subscriber and if the lowest network element supported Maximum Bitrate Value is below the Maximum Bitrate limit associated with the subscriber. In some embodiments it can include determining if a GGSN supported Maximum Bitrate Value is below a Maximum Bitrate limit associated with the subscriber and if the lowest network element supported Maximum Bitrate value is below the Maximum Bitrate limit associated with the subscriber. Additionally or alternatively, in some embodiments it can include determining if an RNC supported Maximum Bitrate value is below a Maximum Bitrate limit associated with the subscriber and if the lowest network element supported Maximum Bitrate value is below the Maximum Bitrate limit associated with the subscriber.

In some instances, embodiments include, a method for a network element to respond to a Maximum Bitrate request of user equipment of a subscriber. The method includes receiving a requested Maximum Bitrate attribute or parameter value, determining if a lowest network element supported Maximum Bitrate value is equal to or less than a Maximum Bitrate limit associated with the subscriber and if the lowest network element supported Maximum Bitrate value is equal to or less than the Maximum Bitrate limit associated with the subscriber, determining a Temporary Working Value from among the requested Maximum Bitrate attribute or parameter value and the Maximum Bitrate limit, and determining if the Temporary Working Value is a network element supported value, above all network element supported values, below all network element supported values or between two network element supported values. Additionally, the method includes offering the Temporary Working Value in response to the Maximum Bitrate request if the lowest value is a network element supported value, offering a highest network element supported value in response to the Maximum Bitrate request if the lowest value is above all network element supported values, offering a lowest supported value in response to the Maximum Bitrate request if the lowest value is below all network element supported values, offering a next higher network element supported value if the lowest value is between the next higher and a next lower network element supported value and the next higher network element supported value is less than or equal to the Maximum Bitrate limit, and offering the next lower network element supported value if the Temporary Working Value is between the next higher and the next lower network element supported value and the next highest network element supported value is greater than the Maximum Bitrate limit.

A network element operative to respond to a Maximum Bitrate request of user equipment of a subscriber, the network element includes means for receiving a requested Maximum Bitrate attribute or parameter value and means for offering to provide communication services in association with a Maximum Bitrate value selected from a subset of a set of supported Maximum Bitrate values, the subset including only those elements of the set of Maximum Bitrate values that are equal to or less than the Maximum Bitrate limit, the selected value being equal to the value of the subset element that is greater than or equal to, the lower of the requested Maximum Bitrate value and the Maximum Bitrate limit, or has the highest value of the subset.

The means for offering can include means for determining a Temporary Working Value from among the requested Maximum Bitrate attribute or parameter value and the Maximum Bitrate limit, and means for determining whether the Temporary Working Value is a network element supported value, above all network element supported values, below all network element supported values or between two network element supported values. Additionally, the means for offering can include means for offering to provide communication services in association with a the Temporary Working Value if the lowest value is a network element supported value, means for offering to provide communication services in association with a highest network element supported value if the Temporary Working Value is above all network element supported values, means for offering to provide communication services in association with a lowest supported value if the Temporary Working Value is below all network element supported values, means for offering to provide communication services in association with a next higher network element supported value if the Temporary Working Value is between a next higher and a next lowest network element supported value and the next higher network element supported value is less than or equal to the Maximum Bitrate limit, and/or means for offering to provide communication services in association with the next lower network element supported value if the Temporary Working Value is between the next higher and the next lower network element supported values and the next higher network element supported value is greater than the Maximum Bitrate limit.

The network element can include an SGSN, a GGSN and/or an RNC.

For example, some embodiments include a network element operative to respond to a Maximum Bitrate request of user equipment of a subscriber. The network element includes a network interface, a first comparator, a second comparator, a bit rate value classifier and a bitrate offer generator. The network interface is operative to receive a requested Maximum Bitrate attribute or parameter value directly or indirectly from the user equipment of the subscriber. In these embodiments, the first comparator is operative to determine if a lowest network element supported Maximum Bitrate value is equal to or less than a Maximum Bitrate limit associated with the subscriber. The second comparator is operative to determine a Temporary Working Value equal to the lowest value selected from among of the requested Maximum Bitrate attribute or parameter value and the Maximum Bitrate limit. The bitrate value classifier is operative to determining if the Temporary Working Value is a network element supported value, above all network element supported values, below all network element supported values or between two network element supported values. The bitrate offer generator is operative to offer the Temporary Working Value in response to the Maximum Bitrate request if the Temporary Working Value is a network element supported value, offer a highest network element supported value in response to the Maximum Bitrate request if the Temporary Working Value is above all network element supported values, offer a lowest supported value in response to the Maximum Bitrate request if the Temporary Working Value is below all network element supported values, offer a next higher network element supported value if the Temporary Working Value is between the next higher and a next lower network element supported value and the next higher network element supported value is less than or equal to the Maximum Bitrate limit; and offer the next lower network element supported value if the Temporary Working Value is between the next higher and the next lower network element supported value and the next higher network element supported value is greater than the Maximum Bitrate limit.

As explained above, the network element can include an SGSN, GGSN and or an RNC.

DESCRIPTION OF DRAWINGS

The invention may take form in various components and arrangements of components, and/or in various procedures and arrangements of procedures. The drawings are only for purposes of illustrating preferred embodiments. They are not to scale, and are not to be construed as limiting the invention.

DETAILED DESCRIPTION OF THE DRAWINGS

Figure 1:
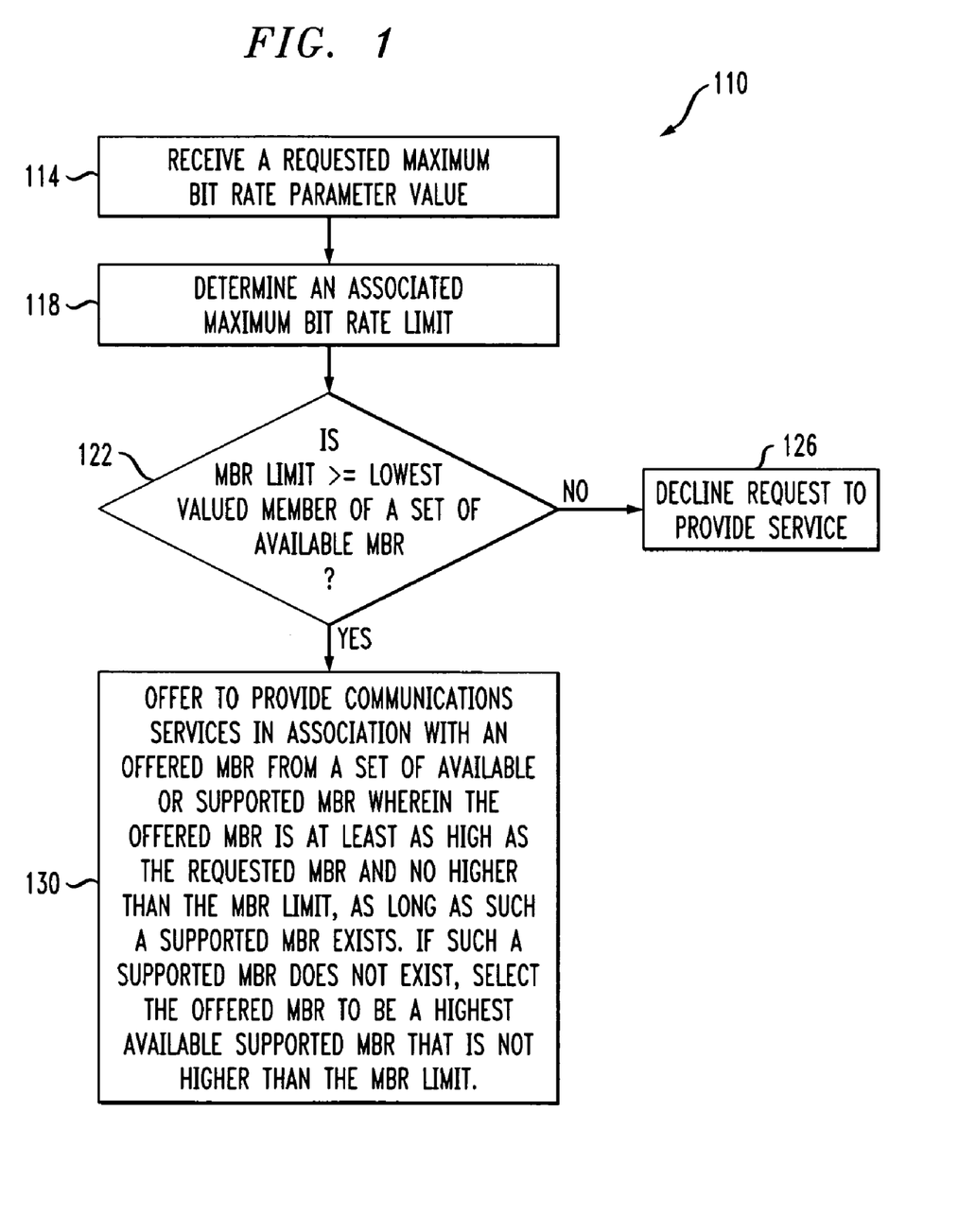
FIG. 1 is a flow chart outlining a method for responding to a maximum bitrate request.

Referring to FIG. 1, a method 110 for a network element, such as, for example, a Serving General Packet Radio Service Support Node (SGSN), to respond to a Maximum Bitrate request of user equipment of a subscriber includes receiving 114, a requested Maximum Bitrate attribute or parameter value, determining 118 an associated Maximum Bitrate limit and determining 122 whether or not the Maximum Bitrate limit is greater than or equal to the lowest valued member of a set of available Maximum Bitrates (MBR). If the Maximum Bitrate limit (associated with, for example, the requesting subscriber) is not above the value of the lowest valued member of the set of available MBRs, then providing the requested service would require a network element (e.g., an SGSN, Node B (Base Station) or GGSN) to devote more network resources (e.g., network bandwidth) to the communication associated with the MBR request than the subscriber has contracted for. Therefore, the network declines 126 to provide the requested service. If the MBR limit is above at least the value of the lowest valued member of the set of available MBRs, an offer 130 is made to provide communication services in association with an Offered MBR value. The Offered MBR value is selected from the set of available or supported MBR. Additionally, the Offered MBR is less than or equal to the MBR limit. Furthermore, the offered MBR is equal to the lower of the requested MBR and the MBR limit, or is equal to the value of one of the members of the set of available or supported MBR values that is between the values of the requested MBR and the MBR limit and closest to the requested MBR, or is the supported MBR value that is closest to the value of the requested MBR without exceeding the value of the MBR limit.

For example, the requested Maximum Bitrate attribute or parameter value is received 114 in a Session Management message, such as, for example, a PDP context request message. For instance, the Session Management Message is received 114 at an SGSN. If the Session Management message is an Activate PDP context request message, it is received 114 from the mobile device of a subscriber. Other Session Management messages that might be received include Update PDP context request messages and Modify PDP context request messages. Update PDP context request messages are received, for example, from GGSNs. Modify PDP context request messages are received from mobile devices.

The network element receiving 114 the requested Maximum Bitrate attribute or parameter value determines 118 the associated Maximum Bitrate limit by requesting that information from a Subscriber Database. For instance, if the network element is an SGSN, the SGSN transmits a query to a Home Location Register (HLR) of the subscriber. The query includes some identification or reference associated with the subscriber. For example, the query includes an International Mobile Subscriber Identity (IMSI) that was included in a prior Mobility Management message. The Home Location Register or Subscriber Database responds with the subscriber record that includes their subscribed for and/or provisioned (UL, DL) Maximum Bitrate limit.

The network element (e.g., SGSN) compares the determined 118 Maximum Bitrate limit with the values in a set of available or supported MBRs. That is, the SGSN is aware of MBR values supported by the SGSN itself. Those values are the set of available or supported MBRs. The lowest valued member of the set of available or supported MBR values is compared to the determined 118 MBR limit. If the MBR limit is less than the value of the lowest valued member of the set of available MBR values, then the subscriber has not subscribed for even the lowest Quality of Service (and related QoS MBR value) the network is capable of providing. Therefore, the network element, or the SGSN, rejects or declines 126 the request to provide service requested by the Session Management message. If the MBR limit is above or equal to at least the value of the lowest valued member of the set of available or supported MBRs, then the subscriber has subscribed for at least the lowest quality of service the network is capable of providing and the network element (e.g., SGSN) is able to offer 130 to provide communication services in association with an Offered MBR.

The Offered MBR has a value equal to one of the members or elements of the set of available or supported MBRs. More specifically, the Offered MBR has a value equal to the value of one of the members or elements of a subset of the set of available or supported MBRs. The subset consists of those members or elements of the set that have values that are less than or equal to the MBR limit. The Offered MBR is selected to have a value equal to or greater than but the requested MBR as long as that value does not exceed the MBR limit (see FIG. 4-FIG. 7). If there is no supported or available MBR value that is equal to or greater than the requested MBR and less than or equal to the MBR limit, the Offered MBR is selected to be the value of the highest available or supported MBR that is less than the MBR limit.

Figure 2:
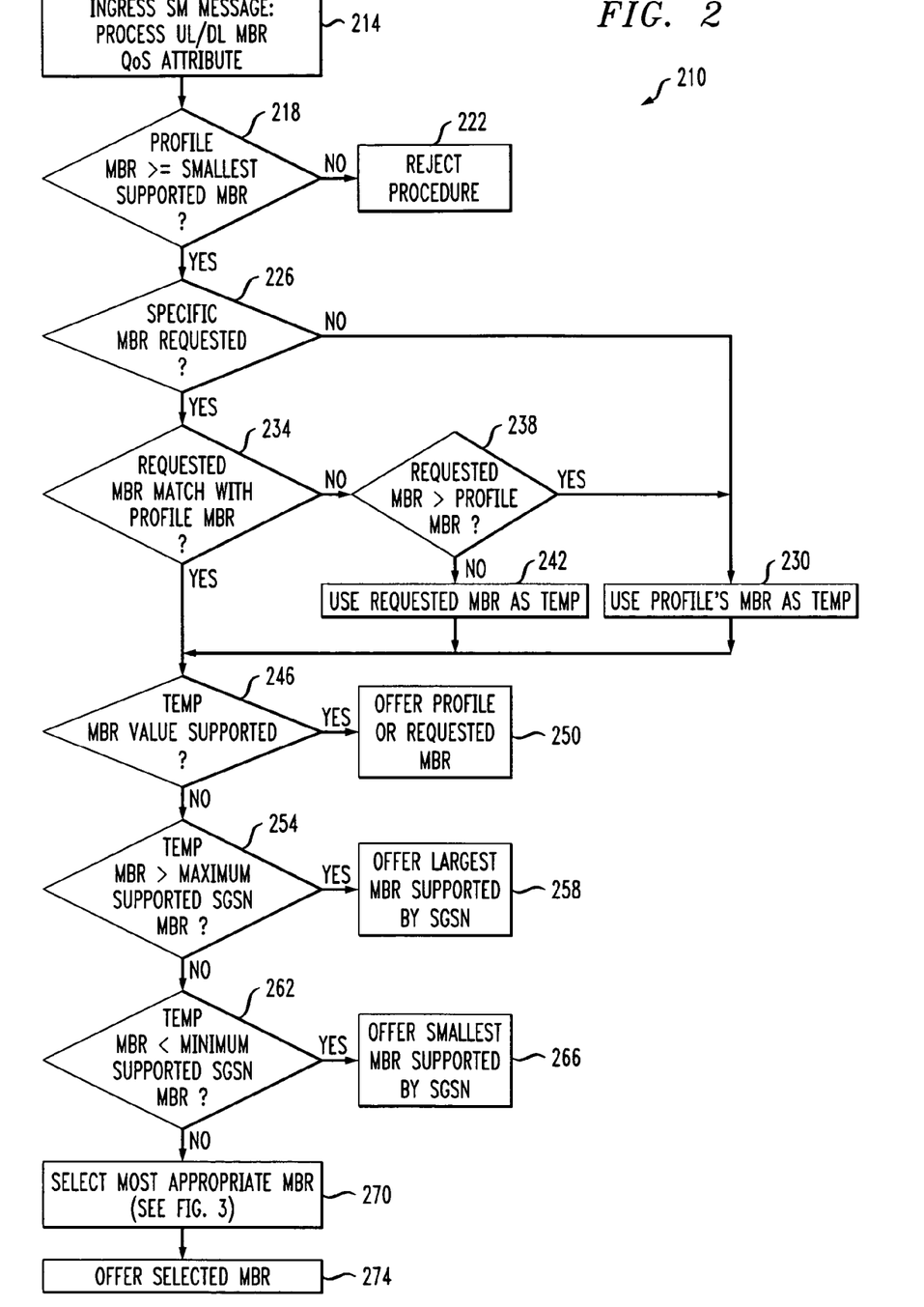
FIG. 2 is a flow chart outlining an embodiment of the method of FIG. 1.

For example, referring to FIG. 2, in one embodiment 210, an SGSN receives 214 an ingress Session Management (SM) message. For example, the SGSN receives a PDP context request message. The ingress Session Management message may include uplink (UL) and/or downlink (DL) Maximum Bitrate (MBR) Quality of Service (QoS) attributes. If the ingress Session Management message includes these MBR attributes, the ingress Session Management message is interpreted as a request for a connection associated with these specific MBR values. If the ingress Session Management message does not include specific MBR attributes, the ingress Session Management message is interpreted as a request that a connection be established in association with default or subscriber profile-based MBR values.

In either case, the SGSN retrieves the profile MBR value associated with the subscriber whose user equipment was responsible for the ingress Session Management message. This profile MBR is an MBR limit associated with the subscriber. The SGSN compares 218 the profile MBR with the smallest or lowest valued supported MBR. For example, the SGSN and/or network component associated with the SGSN may support a set of MBR values consisting of 64, 128 and 384 kilobits per second. In that case, the profile MBR or MBR limit is compared to the 64 kbps MBR value. If the profile MBR or MBR limit is less than the smallest or lowest supported MBR (e.g., 64 kbps), the SGSN determines that providing the requested service would mean providing a service and therefore allocating resources beyond those to which the subscriber is entitled. Therefore, the SGSN rejects 222 or declines to provide the requested service. If the profile MBR or MBR limit is greater than or equal to the value of the smallest or lowest supported or available MBR, then the SGSN continues to process the received 214 ingress Session Management message.

If 226 the received 214 ingress session management message does not include a specific MBR attribute, the SGSN uses 230 the profile MBR or MBR limit received from the Subscriber Database or Home Location Register (HLR) record associated with the subscriber as a Temporary Working MBR Value in further ingress Session Management message processing.

If 226 the ingress session management message does include a specific requested MBR value, the SGSN determines 234 if the specific requested MBR value matches the profile MBR or MBR limit.

If 234 the specific requested MBR does not match the profile MBR or MBR limit, the SGSN determines 238 if the specific requested MBR is greater than the profile MBR or MBR limit. If the specific requested MBR is greater than the profile MBR or MBR limit, then the request is for services beyond those to which the subscriber is entitled and the SGSN replaces the specific requested MBR value with the profile MBR or MBR limit and the MBR limit is used 230 as the Temporary Working Value in further ingress Session Management message processing. If the specific requested MBR is not greater than the profile MBR or MBR limit, then the specific requested MBR is used 242 as the Temporary Working Value in further ingress Session Management message processing.

If it is determined 234 that the specific requested MBR value matches the profile MBR or MBR limit, then that value is used as the Temporary Working Value.

If 246 the Temporary Working Value matches a supported MBR value (or has a value equal to the value of an element of a set of available or supported MBR values), the SGSN makes an Offered MBR value equal to the Temporary Working Value and Offers 250 to provide communication services in association with the offered MBR valve.

If 246 the Temporary Working Value does not exactly match one of the supported or available MBR values, the SGSN determines 254 if the Temporary Working Value is greater than the maximum or largest supported or available MBR value. If the Temporary Working Value is greater or larger than the largest supported MBR value, then the requested MBR is beyond the capabilities of the SGSN or an associated network element and the SGSN offers 258 to provide the requested service in association with the best or highest supported or available MBR.

If the Temporary Working MBR Value is not greater than the maximum supported MBR value, the SGSN determines 262 if the Temporary Working Value is less than the minimum supported or lowest valued MBR in the set of available or supported MBR values. If 262 the Temporary Working Value is less than the minimum or lowest value supported MBR, the requested MBR value is lower than that which can be supported by the SGSN and/or network element associated therewith. Therefore, the SGSN sets the Offered MBR value equal to the lowest or smallest supported MBR (e.g., 64 kbps) and offers 266 to provide communication services in association with this minimum supported MBR value.

If the Temporary Working MBR Value is not less than the minimum supported or smallest valued member of the set of available MBRs, then the Temporary Working Value must, at this point, be between two supported values or members of the set of available MBRs and the SGSN selects 270 the most appropriate MBR from among those values.

Figure 3:
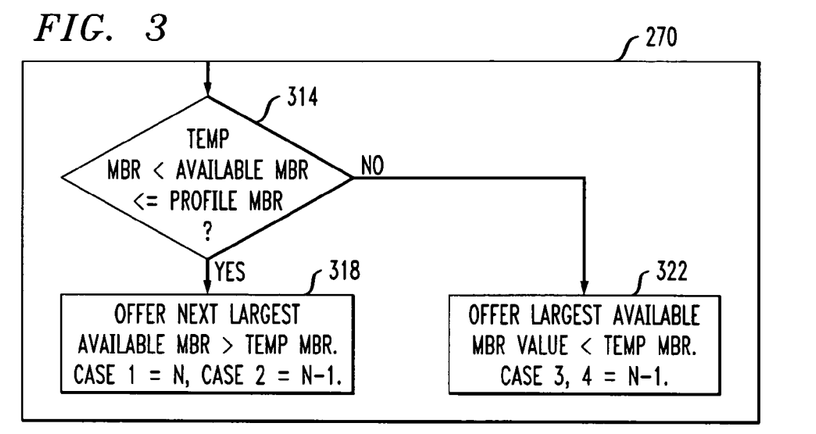
FIG. 3 is a flow chart providing additional detail of an aspect of the embodiment of FIG. 2.
Figure 4:
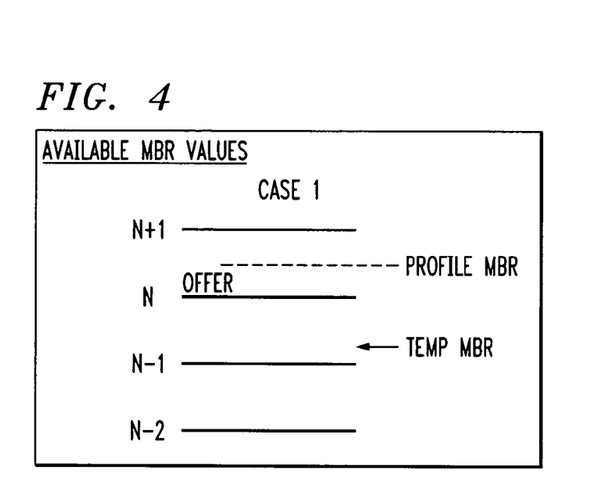
FIG. 4-FIG. 7 are diagrams illustrating relationships of certain attribute or parameter values associated with the embodiment of FIG. 2 and FIG. 3 in various possible scenarios.
Figure 5:
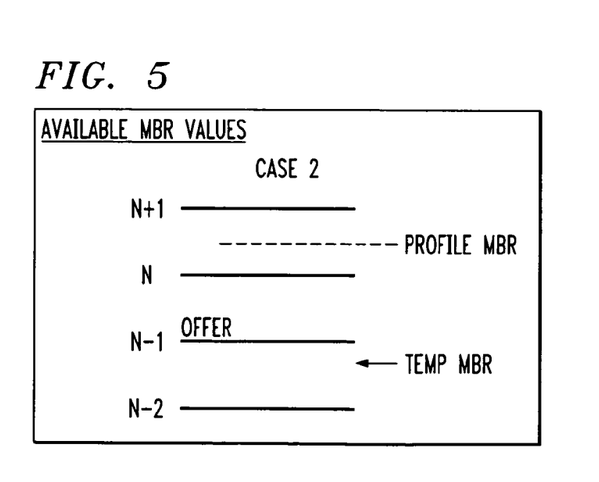

For example, referring to FIG. 3, the SGSN determines 314 if a supported MBR value or a member of the set of available or supported MBR values has a value between the value of the Temporary Working MBR and the value of the profile MBR or MBR limit. If at least one available or supported MBR value lies between the value of the Temporary Working MBR and the profile MBR or MBR limit, then the SGSN selects 318 the value of the member of the set of available or supported MBR values that is closest to but greater than, the Temporary Working MBR as the offered MBR value. For example, if only one member of the set of available MBR values has a value between the value of the Temporary Working MBR and the profile MBR or MBR limit, the SGSN selects that value as the Offered MBR value (see FIG. 4). If several members of the set of available or supported MBR values have values between the value of the Temporary Working MBR and the profile MBR or MBR limit, the SGSN selects 318 the value of the set member that is closest to (but greater than) the Temporary Working MBR Value (see FIG. 5).

Figure 6:
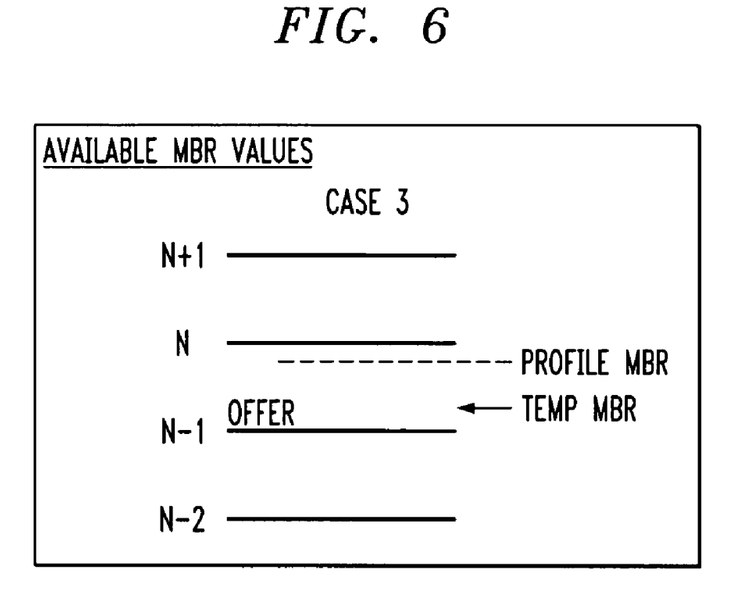
Figure 7:
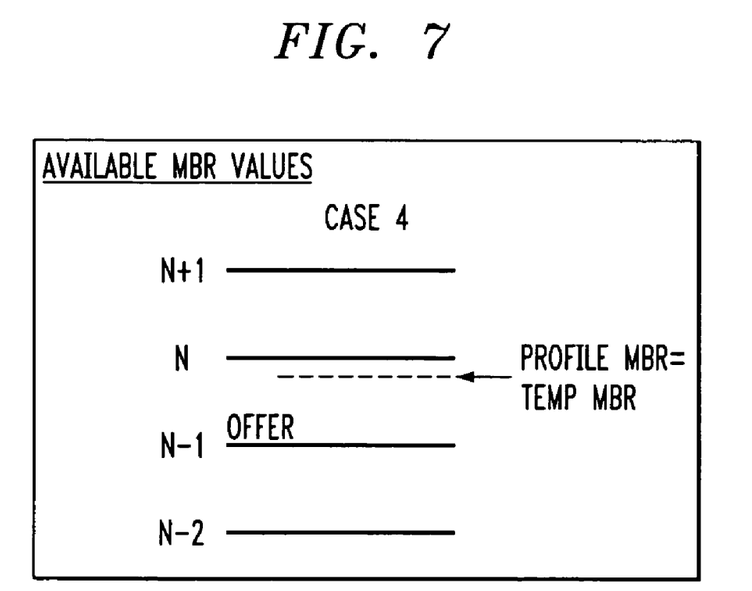

If 314 the set of available or supported MBR values does not include a member that has a value greater than the Temporary Working MBR Value and less than or equal to the profile MBR value or MBR limit, the SGSN selects 322 the member of the set of available or supported MBR values that has the highest value that is less than the Temporary Working MBR Value and sets the Offered MBR value equal to the value of that member (see FIG. 6 and FIG. 7).

Another way to view the logic described above and illustrated in FIG. 3-FIG. 7, is that the Offered MBR is selected from a subset of the set of available or supported MBR values. The subset consists of those members of the set that have values that are less than or equal to the profile MBR or MBR limit. At this point in the processing (270), it is known that the Temporary Working MBR Value is between the values of two members of the set. The SGSN selects the higher valued member as long as that member is within the subset. If the higher valued member is outside the subset, the lower valued member is selected. The Offered MBR value is set equal to the value of the selected member.

Referring to FIG. 2, once the Offered MBR value is set equal to the selected 270 MBR value, the SGSN offers 274 to provide communication services in association with the offered MBR value.

Figure 8:
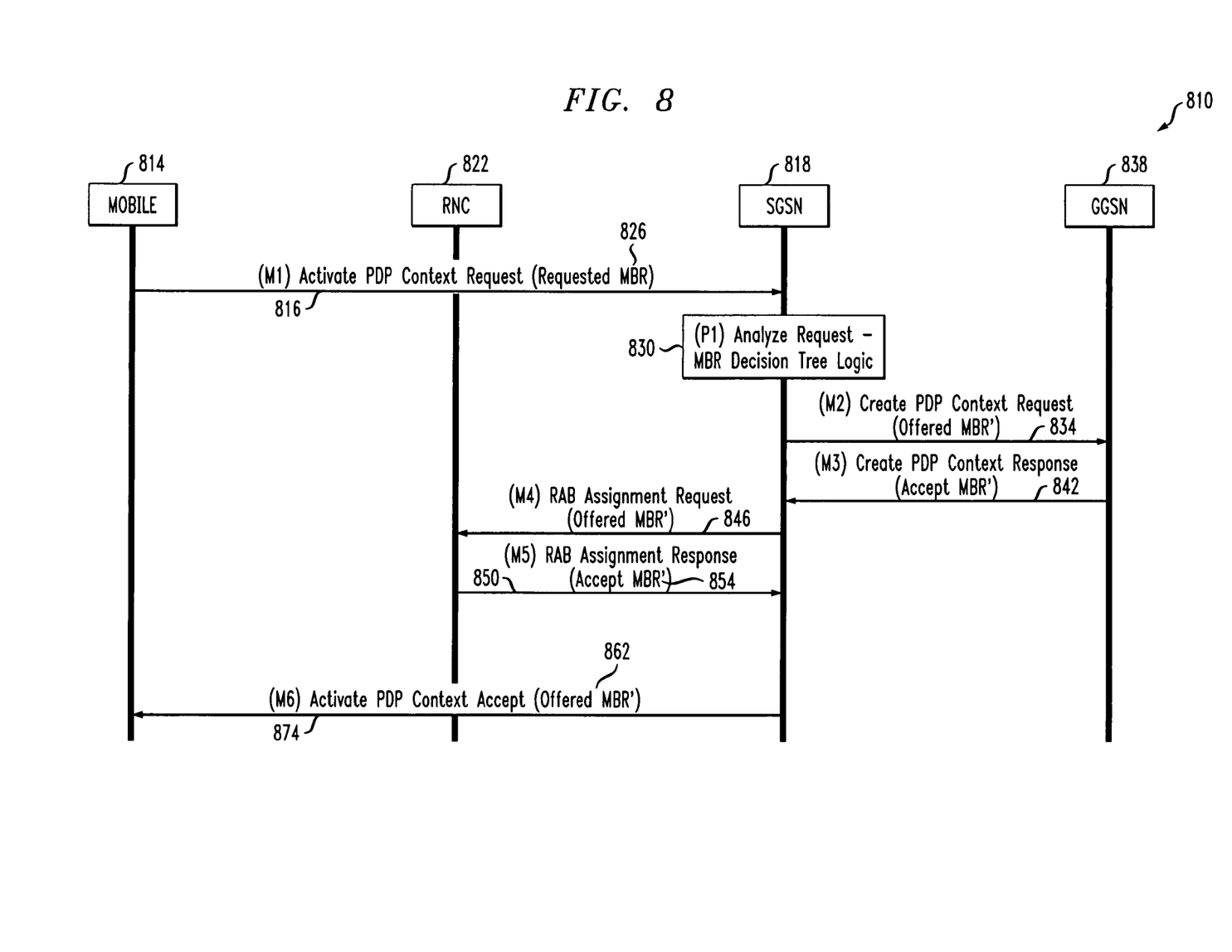
FIG. 8 is a call flow diagram illustrating exemplary call processing events where the method of FIG. 1 is applied.

Referring to FIG. 8, in an exemplary scenario 810, a Mobile Device 814 of a calling party transmits or initiates the transmission of, an Activate PDP Context Request message 816 to an SGSN 818 through the services of a Node B (Base Station or Cell Site) and a Radio Network Controller (RNC) 822. The Activate PDP Context Request message 816 includes a Requested MBR attribute 826. The SGSN 818 processes 830 the request according to the logic described in reference to FIG. 1-FIG. 7. The SGSN 818 then offers 250, 258, 266, or 274 the Offered MBR value in a Create PDP Context Request message 834 directed at a GGSN 838. The GGSN 838 responds with a Create PDP Context Response message 842 accepting the Offered MBR. The SGSN then offers the Offered MBR in an RAB Assignment Request message 846 directed at the RNC 822. It is likely that the RNC 822 will reply by transmitting an RAB Assignment Response message accepting the Offered MBR.

Figure 9:
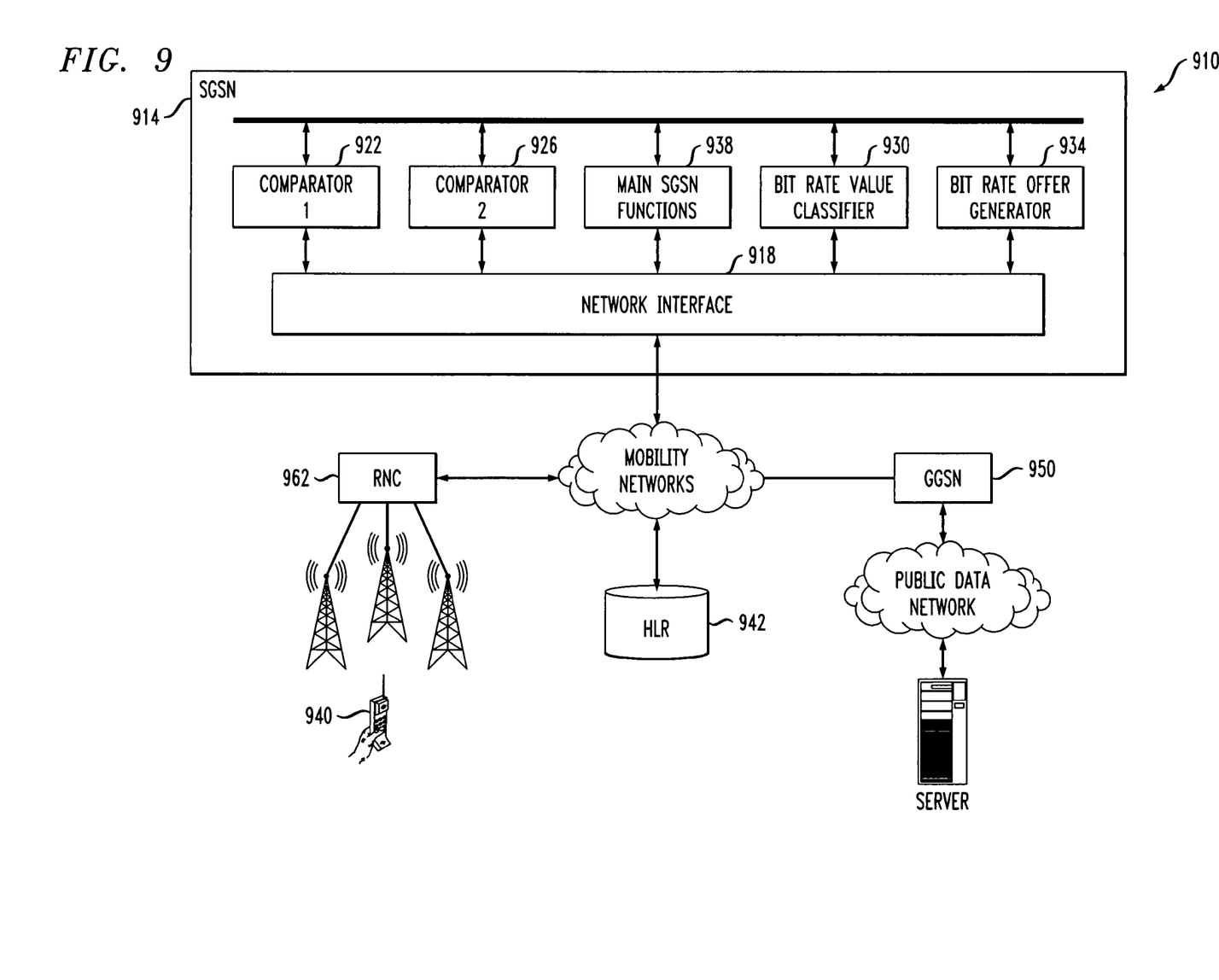
FIG. 9 is a block diagram illustrating a system operative to perform the method of FIG. 1.

Referring to FIG. 9, a system 910 operative to respond to a Maximum Bitrate Request of user equipment of a subscriber includes one or more network elements, such as, an SGSN 914 that include(s) the means for carrying out the procedures of a method (e.g., 110, 210) for responding to a Maximum Bitrate request. For example, the SGSN 914 includes a Network Interface 918, a first Comparator 922, a second Comparator 926, a Bitrate Classifier 930 and a Bitrate Offer Generator 934. Of course, the SGSN 914 also includes Main SGSN Functions 938 known in the art of mobile telecommunications. The Network Interface 918 is operative to, among other things, receive 114, 214, 226 a Maximum Bitrate attribute or parameter value, directly or indirectly, from user equipment of the subscriber. For example, the Maximum Bitrate attribute or parameter value may be included in an Activate PDP Context Request 816 from Mobile Equipment 814 of the subscriber. Alternatively, the Maximum Bitrate attribute or parameter value may be a default attribute or parameter value or a Maximum Bitrate Limit received 114 from a Subscriber Database 942 associated with the calling party or the Mobile Equipment 814, 940 thereof.

The first Comparator 922 is operative to determine 122, 218 if a lowest network element supported Maximum Bitrate value is equal to or less than a Maximum Bitrate Limit associated with the subscriber. For instance, the first comparator 922 requests a profile MBR or MBR limit from a subscriber record stored in a Subscriber Database 942. The first Comparator 922 then compares 122, 218 the received profile MBR or MBR limit to the lowest network element supported Maximum Bitrate value or the member of the set of available or supported MBR having the lowest value. If the lowest network element supported value is equal to or less than the profile MBR or MBR limit associated with the calling party or user equipment thereof, processing is passed to the second Comparator 926.

The second Comparator 926 is operative to determine 234, 238, 246 a Temporary Working Value to be used in further request 114, 214 processing. The Temporary Working Value is determined to be equal to the requested (e.g. 114, 214)

Maximum Bitrate attribute or parameter value or the Maximum Bitrate limit or profile MBR, whichever is lower. Of course, if the requested Maximum Bitrate attribute or parameter value and the MBR limit have the same value, then the Temporary Working Value is determined to be equal to that value. In other words, the Temporary Working Value is set equal to the requested MBR unless the requested MBR is greater than the Maximum Bitrate limit or profile MBR associated with the calling party, or the user equipment associated with the calling party. If the requested MBR is greater than the Maximum Bitrate limit, the Temporary Working Value is set equal to the Maximum Bitrate Limit and the received (e.g. 114, 214) request is processed as if the request were made within the constraints of the subscription associated with the calling party, or the user equipment thereof. Once a Temporary Working Value is determined, processing is passed to the Bitrate Value Classifier 930.

The Bitrate Value Classifier 930 is operative to determine if 246, 254, 262 if the Temporary Working Value is a network element supported value, above all network supported values, below all network supported values or between two network element supported values. For example, the Bitrate Value Classifier compares the Temporary Working Value to the values of members of the set of supported or available MBRs. For instance, if the Temporary Working Value matches the value of one of the members of the set of available or supported MBRs the Bitrate Offer Generator 934 is so notified. Additionally, the Bitrate Value Classifier 930 notifies the Bitrate Offer Generator 934 if the Temporary Working Value is greater than 254 all network element supported MBR values, less than 262 all network element supported MBR values, or if 270 the Temporary Working Value is between two network element supported values.

The Bitrate Offer Generator 934 is operative to generate one or more network messages offering to provide communication services in association with an appropriate MBR value. For instance, the Bitrate Offer Generator 934 is operative to offer to provide communication services in association with the Temporary Working Value in response to the Maximum Bitrate request (e.g., 114, 214) if the Temporary Working Value is a network element supported value. The Bitrate Offer Generator 934 is operative to offer communication services in association with the highest network element supported value if the Temporary Working Value is above all network element supported values, and/or to offer communication services in association with the lowest network element supported value if the Temporary Working Value is below all network element supported values. Additionally, the Bitrate Offer Generator 934 is operative to offer a next higher network element supported MBR value if the Temporary Working Value is between the next higher network element supported value and a next lower network element supported value and the next higher network element supported value is less than or equal to the Maximum Bitrate limit (see FIG. 4 and FIG. 5). Furthermore, the Bitrate Offer Generator 934 is operative to offer the next lower network element supported value of the Temporary Working Value is between the next higher and the next lower network supported value and the next higher network element supported value is greater than the Maximum Bitrate limit (see FIG. 6 and FIG. 7).

The Bitrate Offer Generator 934 may generate offers in conjunction with the main SGSN functions 938. For example, the Bitrate Offer Generator 934 may work with the main SGSN functions 938 to generate offers in the form of Create PDP Context Request messages (e.g., 834) and/or Update PDP Context Request messages (e.g., 866). For instance, the Create PDP Context Request messages and/or Update PDP Context Request messages are sent to a GGSN 950. The RAB Assignment Request messages are, for example, sent to a Radio Network Controller 962 associated with the Node B (Cell Site) serving the User Equipment 940 of the calling party.

The system 910 has been described in terms of an embodiment implemented for the most part within an SGSN 914. However, embodiments are contemplated wherein the functions of the system are distributed over one or more other network elements. For example, the functions 922, 926, 930 and 934 of the system 910 may be implemented within a Radio Network Controller (e.g., 822) or a GGSN (e.g., 838, 950). Additionally, while the system 910 has been described in terms of certain functional blocks 922, 926, 930 and 934, the functions of the system can be implemented in other combinations of functional blocks and by various combinations of hardware and software. The above description merely provides a disclosure of particular embodiments of the invention and is not intended for the purposes of limiting the same thereto. As such, the invention is not limited to only the above-described embodiments. Rather, it is recognized that one skilled in the art could conceive alternative embodiments that fall within the scope of the invention.

I claim:

1. A method for a network element to respond to a maximum bitrate request of user equipment of a subscriber, the method comprising:

receiving a requested maximum bitrate attribute value;
determining if a maximum bitrate limit of the subscriber is equal to or greater than a value of a lowest valued member of a set of available maximum bitrate values;
offering to provide requested communication services in association with an offered maximum bitrate, if the maximum bitrate limit of the subscriber is equal to or greater than the value of the lowest valued member of the set of available maximum bitrate values, the offered maximum bitrate value being equal to a value of a member of an allowable subset of the set of available maximum bitrate values, the allowable subset consisting of members of the set of available maximum bitrates that have values less than or equal to the maximum bitrate limit, and the offered maximum bitrate being equal to a value of a member of the allowable subset that is greater than or equal to, the lower of the requested maximum bitrate value and the maximum bitrate limit, or has the highest value of the subset; and
declining the requested communications service if the maximum bitrate limit of the subscriber is not equal to or greater than the value of lowest valued member of the set of available maximum bitrate values.

2. The method of claim 1 wherein offering to provide the requested communication services in association with the offered maximum bitrate value comprises:

setting a temporary working value equal to a lowest value selected from among the requested maximum bitrate attribute value and the maximum bitrate limit;
determining whether the temporary working value is equal to a value of a member of the allowable subset of the set of available maximum bitrate values, higher than the values of all the members of the allowable subset of the set of available maximum bitrate values, between a next higher valued member and a next lower valued member of the allowable subset of the set of available maximum bitrate values, or lower than the values of all the members in the set of available maximum bitrate values;

setting the offered maximum bitrate value equal to the temporary working value if the temporary working value is equal to the value of a member of the allowable subset of the set of available maximum bitrate values; and offering to provide the requested communications services in association with the offered maximum bitrate value.

3. The method of claim 1 wherein offering to provide the requested communication services in association with the offered maximum bitrate value comprises:

setting a temporary working value equal to a lowest value selected from among the requested maximum bitrate attribute value and the maximum bitrate limit;

determining whether the temporary working value is equal to a value of a member of the allowable subset of the set of available maximum bitrate values, higher than the values of all the members of the allowable subset of the set of available maximum bitrate values, between a next higher valued member and a next lower valued member of the allowable subset of the set of available maximum bitrate values, or lower than the values of all the members in the set of available maximum bitrate values;

setting the offered maximum bitrate value equal to a value of the highest valued member of the allowable subset of the set of available maximum bitrate values if the temporary working value is higher than the values of members of the allowable subset of the set of available maximum bitrate values; and offering to provide the requested communications services at the offered maximum bitrate value.

4. The method of claim 1 wherein offering to provide the requested communications services in association with the offered maximum bitrate value comprises:

setting a temporary working value equal to a lowest value selected from among the requested maximum bitrate attribute value and the maximum bitrate limit;

determining whether the temporary working value is equal to a value of a member of the allowable subset of the set of available maximum bitrate values, higher than the values of all the members of the allowable subset of the set of available maximum bitrate values, between a next higher valued member and a next lower valued member of the allowable subset of the set of available maximum bitrate values, or lower than the values of all the members in the set of available maximum bitrate values;

setting the offered maximum bitrate value equal to a value of a lowest valued member of the allowable subset of the set of available maximum bitrate values if the temporary working value is lower than all the values of members of the set of available maximum bitrate values; and offering to provide the requested communications services at the offered maximum bitrate value.

5. The method of claim 1 wherein offering to provide the requested communications services in association with the offered maximum bitrate value comprises:

setting a temporary working value equal to a lowest value selected from among the requested maximum bitrate attribute value and the maximum bitrate limit;

determining whether the temporary working value is equal to a value of a member of the allowable subset of the set of available maximum bitrate values, higher than the values of all the members of the allowable subset of the set of available maximum bitrate values, between a next higher valued member and a next lower valued member of the allowable subset of the set of available maximum bitrate values, or lower than the values of all the members in the set of available maximum bitrate values;

setting the offered maximum bitrate value equal to a value of the next higher valued member of the allowable subset of the set of available maximum bitrate values if the temporary working value is between the next higher and the next lower valued members of the allowable subset of the set of available maximum bitrate values and the next higher valued member is less than or equal to the maximum bitrate limit; and setting the offered maximum bitrate value equal to a value of the next lower member of the allowable subset of the set of available maximum bitrate values if the temporary working value is between the next higher and the next lower valued members and the next higher member is greater than the maximum bitrate limit.

6. A method for a network element to respond to a maximum bitrate request of user equipment of a subscriber, the method comprising:

receiving a requested maximum bitrate attribute value;

determining if a lowest network element supported maximum bitrate value is equal to or less than a maximum bitrate limit associated with the subscriber and if the lowest network element supported maximum bitrate value is equal to or less than the maximum bitrate limit associated with the subscriber;

determining a temporary working value from among the requested maximum bitrate attribute value and the maximum bitrate limit;

determining whether the temporary working value is a network element supported value, above all network element supported values, below all network element supported values or between two network element supported values; and offering a value in response to the maximum bitrate request based on the determination of whether the temporary working value is above all network element supported values, below all network element supported values or between two network element supported values.

7. The method of claim 6 wherein offering the value in response to the maximum bitrate request based on the determination of whether the temporary working value is above all network element supported values, below all network element supported values or between two network element supported values comprises:

offering the temporary working value in response to the maximum bitrate request if the temporary working value is a network element supported value.

8. The method of claim 6 wherein offering the value in response to the maximum bitrate request based on the determination of whether the temporary working value is above all network element supported values, below all network element supported values or between two network element supported values comprises:

offering a highest network element supported value in response to the maximum bitrate request if the temporary working value is above all network element supported values.

9. The method of claim 6 wherein offering the value in response to the maximum bitrate request based on the determination of whether the temporary working value is above all network element supported values, below all network element supported values or between two network element supported values comprises:

offering a lowest network element supported value in response to the maximum bitrate request if the temporary working value is below all network element supported values.

10. The method of claim 6 wherein offering the value in response to the maximum bitrate request based on the determination of whether the temporary working value is above all network element supported values, below all network element supported values or between two network element supported values comprises:
   offering a next higher network element supported value if the temporary working value is between the next higher and a next lower network element supported value and the next higher network element supported value is less than or equal to the maximum bitrate limit; and
   offering the next lower network element supported value if the temporary working value is between the next higher and the next lower network element supported values and the next higher network element supported value is greater than the maximum bitrate limit.

11. The method of claim 6 wherein offering the value in response to the maximum bitrate request based on the determination of whether the temporary working value is above all network element supported values, below all network element supported values or between two network element supported values comprises:
   offering a next higher network element supported value if the temporary working value is between the next higher and a next lower network element supported value and the next higher network element supported value is less than or equal to the maximum bitrate limit.

12. The method of claim 6 wherein offering the value in response to the maximum bitrate request based on the determination of whether the temporary working value is above all network element supported values, below all network element supported values or between two network element supported values comprises:
   offering a next lower network element supported value if the temporary working value is between a next higher and the next lower network element supported value and the next higher network element supported value is greater than the maximum bitrate limit.

13. The method of claim 6 wherein determining if the lowest network element supported maximum bitrate value is below the maximum bitrate limit associated with the subscriber comprises:
   determining if an SGSN supported maximum bitrate value is below the maximum bitrate limit associated with the subscriber.

14. The method of claim 6 wherein determining if the lowest network element supported maximum bitrate value is below the maximum bitrate limit associated with the subscriber comprises:
   determining if a GGSN supported maximum bitrate value is below the maximum bitrate limit associated with the subscriber.

15. The method of claim 6 wherein determining if the lowest network element supported maximum bitrate value is below the maximum bitrate limit associated with the subscriber comprises:
   determining if an RNC supported maximum bitrate value is below the maximum bitrate limit associated with the subscriber.

16. A method for a network element to respond to a maximum bitrate request of user equipment of a subscriber, the method comprising:
   receiving a requested maximum bitrate attribute value;
   determining if a lowest network element supported maximum bitrate value is equal to or less than a maximum bitrate limit associated with the subscriber and if the lowest network element supported maximum bitrate value is equal to or less than the maximum bitrate limit associated with the subscriber;
   determining a temporary working value from among the requested maximum bitrate attribute value and the maximum bitrate limit;
   determining if the temporary working value is a network element supported value, above all network element supported values, below all network element supported values or between two network element supported values;
   offering the temporary working value in response to the maximum bitrate request if the temporary working value is a network element supported value;
   offering a highest network element supported value in response to the maximum bitrate request if the temporary working value is above all network element supported values;
   offering a lowest supported value in response to the maximum bitrate request if the temporary working value is below all network element supported values;
   offering a next higher network element supported value if the temporary working value is between the next higher and a next lower network element supported value and the next higher network element supported value is less than or equal to the maximum bitrate limit; and
   offering the next lower network element supported value if the temporary working value is between the next higher and the next lower network element supported value and the next highest network element supported value is greater than the maximum bitrate limit.

17. A network element operative to respond to a maximum bitrate request of user equipment of a subscriber, the network element comprising:
   means for receiving a requested maximum bitrate attribute value; and means for determining if a maximum bitrate limit of the subscriber is equal to or greater than a value of a lowest valued member of a set of available maximum bitrate values;
   means for offering to provide communication services in association with a maximum bitrate value selected from a subset of the set of available maximum bitrate values, if the maximum bitrate limit of the subscriber is equal to or greater than the value of the lowest valued member of the set of available maximum bitrate values, the subset including only those elements of the set of maximum bitrate values that are equal to or less than the maximum bitrate limit of the subscriber, the selected value being equal to the value of the subset element that is greater than or equal to, the lower of the requested maximum bitrate value and the maximum bitrate limit, or has the highest value of the subset.

18. The network element of claim 17 wherein the means for offering to provide communication services in association with the maximum bitrate value selected from the subset of the set of maximum available bitrate values comprises:
   means for determining a temporary working value from among the requested maximum bitrate attribute value and the maximum bitrate limit;
   means for determining whether the temporary working value is a network element supported value, above all network element supported values, below all network element supported values or between two network element supported values; and
   means for offering to the provide communication services in association with the temporary working value if the temporary working value is a network element supported value.

19. The network element of claim 17 wherein the means for offering to provide communication services in association with the maximum bitrate value selected from the subset of the set of maximum bitrate values comprises:
- means for determining a temporary working value from among the requested maximum bitrate attribute value and the maximum bitrate limit;
- means for determining whether the temporary working value is a network element supported value, above all network element supported values, below all network element supported values or between two network element supported values; and
- means for offering to provide the communication services in association with a highest network element supported value if the temporary working value is above all network element supported values.

20. The network element of claim 17 wherein the means for offering to provide communication services in association with the maximum bitrate value selected from the subset of the set of maximum bitrate values comprises:
- means for determining a temporary working value from among the requested maximum bitrate attribute value and the maximum bitrate limit;
- means for determining whether the temporary working value is a network element supported value, above all network element supported values, below all network element supported values or between two network element supported values; and
- means for offering to provide the communication services in association with a lowest supported value if the temporary working value is below all network element supported values.

21. The network element of claim 17 wherein the means for offering to provide communication services in association with the maximum bitrate value selected from the subset of the set of maximum bitrate values comprises:
- means for determining a temporary working value from among the requested maximum bitrate attribute value and the maximum bitrate limit;
- means for determining whether the temporary working value is a network element supported value, above all network element supported values, below all network element supported values or between two network element supported values;
- means for offering to provide communication services in association with a next higher network element supported value if the temporary working value is between the next higher and a next lowest network element supported value and the next higher network element supported value is less than or equal to the maximum bitrate limit; and
- means for offering to provide communication services in association with the next lower network element supported value if the temporary working value is between the next higher and the next lower network element supported values and the next higher network element supported value is greater than the maximum bitrate limit.

22. The network element of claim 17 wherein the network element comprises an SGSN.

23. The network element of claim 17 wherein the network element comprises a GGSN.

24. The network element of claim 17 wherein the network element comprises an RNC.

25. A network element operative to respond to a maximum bitrate request of user equipment of a subscriber, the network element comprising:
- a network interface operative to receive a requested maximum bitrate attribute value directly or indirectly from the user equipment of the subscriber;
- a first comparator operative to determine if a lowest network element supported maximum bitrate value is equal to or less than a maximum bitrate limit associated with the subscriber;
- a second comparator operative to determine a temporary working value equal to the lowest value selected from among of the requested maximum bitrate attribute value and the maximum bitrate limit;
- a bitrate value classifier operative to determining if the temporary working value is a network element supported value, above all network element supported values, below all network element supported values or between two network element supported values;
- a bitrate offer generator operative to offer the temporary working value in response to the maximum bitrate request if the temporary working value is a network element supported value, offer a highest network element supported value in response to the maximum bitrate request if the temporary working value is above all network element supported values, offer a lowest supported value in response to the maximum bitrate request if the temporary working value is below all network element supported values, offer a next higher network element supported value if the temporary working value is between the next higher and a next lower network element supported value and the next higher network element supported value is less than or equal to the maximum bitrate limit; and offer the next lower network element supported value if the temporary working value is between the next higher and the next lower network element supported value and the next higher network element supported value is greater than the maximum bitrate limit.

26. The network element of claim 25 wherein the network element comprises an SGSN.

27. The network element of claim 25 wherein the network element comprises a GGSN.

28. The network element of claim 25 wherein the network element comprises an RNC.

* * * * *